United States Patent [19]

Church et al.

[11] 3,922,163

[45] Nov. 25, 1975

[54] ORGANIC COMPOUNDS AND PROCESS

[75] Inventors: Allen R. Church, Kalamazoo, Mich.; Gerhard A. Huppi, Greifensee, Switzerland

[73] Assignee: The Upjohn Company, Kalamazoo, Mich.

[22] Filed: Nov. 23, 1970

[21] Appl. No.: 92,285

Related U.S. Application Data

[63] Continuation-in-part of Ser. No. 7,227, Jan. 30, 1970, abandoned.

[52] U.S. Cl. ............................ 71/95; 71/66; 71/67; 260/326.3
[51] Int. Cl.² ............................................ A01N 9/22
[58] Field of Search ............................ 71/95, 66, 67

[56] References Cited
FOREIGN PATENTS OR APPLICATIONS
937,160   9/1963   United Kingdom

OTHER PUBLICATIONS

Plant Regulators, CBCC Positive Data Series No. 2, June 1955, pp. a, b, e & 41.

*Primary Examiner*—James O. Thomas, Jr.
*Attorney, Agent, or Firm*—Martin B. Barancik; Roman Saliwanchik

[57] ABSTRACT

Certain 4-methyl-2-variable diesters of 5-methyl-3-variable'-2,4-pyrroledicarboxylic acids have been found to be active as herbicides and for regulating plant growth. All are new, except the 4-methyl-2-tert-alkyl esters of 3,5-dimethyl-2,4-pyrroledicarboxylic acid. These exceptions were known for diazotype paper coating. A new weed control method using the compounds is described as well as new formulations for herbicidal use and for regulating plant growth. The compounds are prepared by conventional chemical reactions and they are purified by conventional procedures.

24 Claims, No Drawings

ORGANIC COMPOUNDS AND PROCESS

CROSS REFERENCE TO RELATED APPLICATIONS

This application is a continuation-in-part of U.S. application Ser. No. 7227 filed Jan. 30, 1970, now abandoned.

SUMMARY OF THE INVENTION

This invention pertains to some new organic chemical compounds, to a process for preparing the same, to a new method for controlling weeds, and to new formulations for herbicidal use and for plant growth regulation. The invention is more particularly directed to a new method for controlling weeds and growth of plants with 4-methyl-2-variable diesters of 5-methyl-3-variable'-2,4-pyrroledicarboxylic acids, to a process for preparing the same by heating and reacting "variable" esters of 2-amino-3-oxoalkanoic acids and "variable" esters of 2-amino-3-oxohaloalkanoic acids with methyl acetoacetate to produce the desired 4-methyl-2-variable diesters of 5-methyl-3-variable'-2,4-pyrroledicarboxylic acids, to new formulations containing the same, and to new 4-methyl-2-variable diesters of 5-methyl-3-variable"-2,4-pyrroledicarboxylic acids.

The herbicidal 4-methyl-2-variable diesters of 5-methyl-3-variable'-2,4-pyrroledicarboxylic acids of the method of this invention have the following general structural formula:

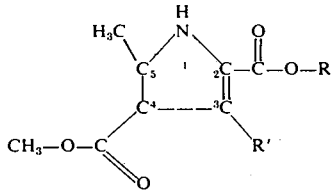

wherein the variable R is alkyl of from 2 to 12 carbon atoms, inclusive, haloalkyl of from 2 to 12 carbon atoms, inclusive, alkenyl of from 3 to 8 carbon atoms, inclusive, haloalkenyl of from 3 to 8 carbon atoms, inclusive, cycloalkyl of from 3 to 6 ring atoms, inclusive, cycloalkenyl of from 4 to 6 ring atoms, inclusive, alkyl or halogen substituted cycloalkyl of from 4 to 12 carbon atoms, inclusive, alkyl or halogen substituted cycloalkenyl of from 5 to 12 carbon atoms, inclusive, cycloalkyl or cycloalkenyl substituted lower-alkyl of from 4 to 12 carbon atoms, inclusive, and alkoxy substituted lower-alkyl having a total of from 3 to 9 carbon atoms, inclusive, and the variable R' is hydrogen, methyl (except when R is ethyl), ethyl, propyl, isopropyl, butyl, isobutyl, sec-butyl, tert-butyl, and the halogenated forms thereof.

The compounds of Formula 1 include the new 4-methyl-2-variable diesters of 5-methyl-3-variable"-2,4-pyrroledicarboxylic acids of this invention. All but two of the compounds of Formula 1 are new. The compounds wherein variable R is tertiary alkyl and variable R' is methyl are taught in British Pat. No. 937,160 (published Sept. 18, 1963) for the purpose of coating on diazotype base papers in reproduction. Accordingly changing variable "R'" in Formula 1 to variable R" and defining R" as excluding methyl when R is tert-alkyl, serves to differentiate the method of use invention from the patentably new compounds.

DETAILED DESCRIPTION OF THE INVENTION

The compounds of Formula 1, and particularly the new compounds of this invention are distinguished from other closely related compounds by their excellent herbicidal and plant growth regulatory activity. No theoretical explanation of this discontinuity of biological activity is contemplated, but objective, comparative tests against a representative selection of common weeds established the fact of significant differences in biological activity and provide basis of patentability of this contribution to science and the useful arts.

Up to the time of the preparation of this specification, the inventors have actually synthesized, purified, tested, and found active some 24 compounds which are members of the new group. Many other species of the invention (compounds according to Formula 1) are contemplated. The species synthesized are:

2-ethyl-4-methyl diester of 3-ethyl-5-methyl-2,4-pyrroledicarboxylic acid,
2-ethyl-4-methyl diester of 5-methyl-3-propyl-2,4-pyrroledicarboxylic acid (preferred),
2-ethyl-4-methyl diester of 5-methyl-3-trifluoromethyl-2,4-pyrroledicarboxylic acid (preferred),
4-methyl-2-(2,2,2-trifluoroethyl) diester of 3,5-dimethyl-2,4-pyrroledicarboxylic acid (preferred),
4-methyl-2-(2-chloroethyl) diester of 3,5-dimethyl-2,4-pyrroledicarboxylic acid (preferred),
4-methyl-2-propyl diester of 3,5-dimethyl-2,4-pyrroledicarboxylic acid (preferred),
4-methyl-2-(2,2,3,3,3-pentafluoropropyl) diester of 3,5-dimethyl-2,4-pyrroledicarboxylic acid (preferred),
4-methyl-2-(2-bromoethyl) diester of 3,5-dimethyl-2,4-pyrroledicarboxylic acid (preferred),
4-methyl-2-(2,2,2-trichloroethyl) diester of 3,5-dimethyl-2,4-pyrroledicarboxylic acid (preferred),
4-methyl-2-(2-methoxyethyl) diester of 3,5-dimethyl-2,4-pyrroledicarboxylic acid,
2-isopropyl-4-methyl diester of 3,5-dimethyl-2,4-pyrroledicarboxylic acid (preferred),
4-methyl-2-[2,2,2-trifluoro-1-(trifluoromethyl)ethyl] diester of 3,5-dimethyl-2,4-pyrroledicarboxylic acid (preferred),
4-methyl-2-n-butyl diester of 3,5-dimethyl-2,4-pyrroledicarboxylic acid,
4-methyl-2-sec-butyl diester of 3,5-dimethyl-2,4-pyrroledicarboxylic acid (preferred),
2-isobutyl-4-methyl diester of 3,5-dimethyl-2,4-pyrroledicarboxylic acid (preferred),
2-(1-ethylpropyl)-4-methyl diester of 3,5-dimethyl-2,4-pyrroledicarboxylic acid (preferred),
4-methyl-2-(2-neopentyl) diester of 3,5-dimethyl-2,4-pyrroledicarboxylic acid (preferred),
2-cyclohexyl-4-methyl diester of 3,5-dimethyl-2,4-pyrroledicarboxylic acid,
4-methyl-2-n-octyl diester of 3,5-dimethyl-2,4-pyrroledicarboxylic acid,
4-methyl-2-(1-methylheptyl) diester of 3,5-dimethyl-2,4-pyrroledicarboxylic acid (preferred),
4-methyl-2-dodecyl diester of 3,5-dimethyl-2,4-pyrroledicarboxylic acid,
2-ethyl-4-methyl diester of 5-methyl-2,4-pyrroledicarboxylic acid,
4-methyl-2-isopropyl diester of 3-ethyl-5-methyl-2,4-pyrroledicarboxylic acid,
4-methyl-2-isopropyl diester of 5-methyl-3-propyl-2,4-pyrroledicarboxylic acid, 2-allyl-4-methyl diester of 3,5-dimethyl-2,4-pyrroledicarboxylic acid.

Some of the closely related but herbicidally inactive compounds are 2,4-diethyl ester of 3,5-dimethyl-2,4-pyrroledicarboxylic acid, 2,4-dimethyl ester of 3,5-dimethyl-2,4-pyrroledicarboxylic acid, 2-ethyl-4-methyl diester of 3-methyl-2,4-pyrroledicarboxylic acid, 2-ethyl-4-methyl diester of 1,3,5-trimethyl-2,4-pyrroledicarboxylic acid, 4-methyl ester of 3,5-dimethyl-2,4-pyrroledicarboxylic acid, and others.

From an evaluation of the foregoing active and inactive compounds, and being aware of the teachings in the British Patent, the inventors contemplate the new compound embodiment of their invention as the new 4-methyl-2-variable diesters of 5-methyl-3-variable''-2,4-pyrroledicarboxylic acids having the formula:

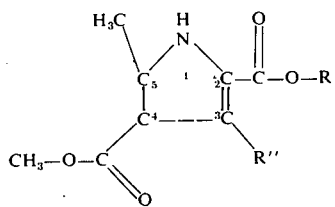

II wherein the variable R is alkyl of from 2 to 12 carbon atoms, inclusive, haloalkyl, alkenyl, haloalkenyl, cycloalkyl, cycloalkenyl, alkyl or halogen substituted cycloalkyl, alkyl or halogen substituted cycloalkenyl, cycloalkyl or cycloalkenyl substituted lower-alkyl, and alkoxy substituted lower-alkyl as defined in Formula I and R'' is hydrogen, methyl (except when R is ethyl or tert-alkyl) ethyl, propyl, isopropyl, butyl, isobutyl, sec-butyl, tert-butyl, and the halogenated forms thereof.

The scope of the variable R is described hereinabove in general terms. More specifically, alkyl of from 2 to 12 carbon atoms, inclusive, includes, for example, ethyl, propyl, butyl, pentyl, hexyl, heptyl, octyl, nonyl, decyl, undecyl, dodecyl, and the various isomeric forms thereof, for example, isopropyl, isobutyl, sec-butyl, neopentyl, 2-methylheptyl, and the like.

Haloalkyl of from 2 to 12 carbon atoms, inclusive, includes, for example, 2,2,2-trifluoroethyl; 2-chloroethyl; 1,2-dichloroethyl; 2,2,2-trichloroethyl; 2-bromoethyl; 3,3,3-trifluoropropyl, 2-iodoethyl; 2,2,3,3,3-pentafluoropropyl; 3,3,3-triiodopropyl; 2,2-dibromopropyl; 3-chloropropyl; 3-iodopropyl; 3-bromopropyl; 2,3-dibromobutyl; 5-fluoropentyl, 4-iodooctyl, 3,3-dibromodecyl; 2,3,7,8-tetrachlorododecyl, isomeric forms thereof, and the like.

Alkenyl of from 3 to 8 carbon atoms, inclusive includes, for example, allyl, methallyl, propenyl, 1-ethylpropenyl, isopropenyl, 1-lower-alkyl-1-propenyl, 2-butenyl (crotyl), 3-butenyl, 1-lower-alkyl-1-butenyl, 1,2-dimethylallyl, 5-hexenyl, 1-heptenyl, 1-lower-alkyl-1-heptenyl, e.g., 1-methyl-1-heptenyl, 2,4-hexadienyl, and the like.

Haloalkenyl of from 3 to 8 carbon atoms, inclusive, includes, for example, 2-chloroallyl, 3-chloro-2-butenyl, 2-chloro-3-fluoroallyl, 3,3-dichloro-2-methylallyl, 2,3,3-trichloroallyl, and the like.

Cycloalkyl of from 3 to 6 ring atoms, inclusive includes for example, cyclopropyl, cyclobutyl, cyclopentyl, and cyclohexyl.

Alkyl or halogen substituted cycloalkyl or from 4 to 12 carbon atoms, inclusive, includes, for example, 2-methylcyclopropyl, 2-methylcyclopentyl, 3-methylcyclohexyl, 3-ethylcyclopentyl, 3-isopropylcyclopentyl, 2-methyl-4-ethylcyclohexyl, 4-tert-butylcyclohexyl, 4-n-butylcycloheptyl, 3,5-di-n-propylcyclohexyl, 2-chlorocyclohexyl, 4-chlorocyclohexyl, and the like.

Cycloalkenyl of from 4 to 6 ring atoms, includes, for example, cyclobutenyl, cyclopentenyl, cyclopentadienyl, 1-, 2-, or 3-cyclohexenyl, and the like.

Alkyl or halogen substituted cycloalkenyl of from 5 to 12 carbon atoms includes, for example, 1-methylcyclobutenyl, 3-bromocyclohexenyl, 1-isopropyl-4-methylcyclohexenyl (menthene), 1-methylcyclohexenyl, 1,3,4,5,6-pentachlorocyclohexenyl, 3,5-diisopropylcyclohexenyl, and the like.

Cycloalkyl or cycloalkenyl substituted lower-alkyl of from 4 to 12 carbon atoms, inclusive, includes cyclopropylmethyl, cyclobutylmethyl, cyclopentylmethyl, 1-cyclopentylethyl, 2-cyclopentylethyl, 2-cyclopentylpropyl, 1- or 2-cyclohexylethyl, 2-cyclopententylmethyl, 2-(2-cyclopentenyl)ethyl, 2-(2,2,3-trimethyl-3-cyclopentenyl)ethyl, 2-(3-cyclohexenyl)propyl, 3-(2-cyclohexenyl)butyl, and the like.

Alkoxy substituted lower-alkyl having a total of from 3 to 9 carbon atoms, inclusive, includes 2-methoxyethyl, 2-ethoxyethyl, 2-isopropoxyethyl, 2-butoxyethyl, 1-methyl-2-methoxyethyl, 1,1-dimethyl-2-methoxyethyl, 3-methoxypropyl, 1-methyl-3-methoxybutyl, 4-ethoxy-n-hexyl; 4-(n-propoxy)amyl, 1-methoxyisobutyl, 2-methoxyoctyl, and the like.

The new compounds are readily prepared according to the procedure described by William Küster many years ago. Kuster [Zeitschrift fur physiol. Chemie 121: p. 135 (1922)] described the method of preparing the 2-ethyl-4-methyl diester of 3,5-dimethyl-2,4-pyrroledicarboxlic acid by heating and reacting ethyl 2-amino-3-oxobutyrate with methyl acetoacetate. The same type reaction can be used to prepare the new compounds of this invention. For example, the compounds of Formula I wherein R' is the indicated lower-alkyl or halolower-alkyl groups are prepared by reacting an appropriate "variable" ester of 2-amino-3-oxoalkanoic acid or an appropriate "variable" ester of 2-amino-3-oxohaloalkanoic acid with methyl acetoacetate. The 2-amino-3-oxoalkanoate esters give the compounds of Formula I wherein R' is alkyl. The 2-amino-3-oxohaloalkanoate esters give the compounds of Formula I wherein R' is haloalkyl. Illustratively, 2-ethyl-4-methyl diester of 5-methyl-3-trifluoromethyl 2,4-pyrroledicarboxylic acid is prepared by using ethyl 2-amino-3-oxo-4,4,4-trifluorobutyrate.

The compounds of Formula I wherein R' is hydrogen are prepared by reacting an appropriate ester of 2-amino malonaldehydic acid (e.g., an alkyl 2-amino malonaldate, illustratively ethyl 2-amino malonaldate) with methyl acetoacetate.

The alkyl, haloalkyl, cycloalkyl, alkylcycloalkyl, halocycloalkyl, cycloalkyllower-alkyl, and alkoxyloweralkyl esters of 2-amino 3-oxoalkanoic acids or 2-amino-3-haloalkyl-3-oxopropionic acids which are used as intermediates for preparing compounds according to Formula I are prepared in the same manner as described by Küster when the halogen atoms are fluorine.

Illustratively the indicated esters of a 3-oxoalkanoic acid or of a 3-oxohaloalkanoic acid of the formulae

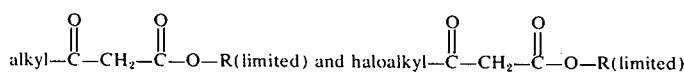

is reacted with nitrous acid (generated in situ by means of sodium nitrate in the presence of a lower-alkanoic acid, preferably acetic acid), to produce the corresponding esters of 2-oximido-3-oxoalkanoic acid and 2-oximido-3-oxohaloalkanoic acid of the formulae

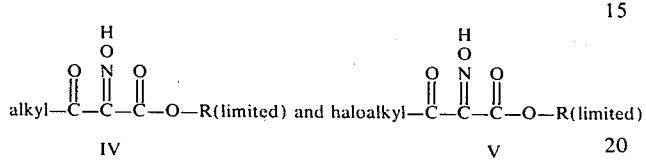

The desired corresponding 2-amino esters are obtained by reduction of the oxime group (Formulas IV and V, above). Reduction is accomplished by any of the known methods of using hydrogen in the presence of a metal catalyst. Advantageously, the reduction is effected with hydrogen in the presence of a noble metal catalyst, for example, platinum, palladium, rhodium, and the like; although base metal catalysts can be used, for example, Raney nickel, Raney cobalt, and the like.

Conveniently, reduction of an oxime according to Formulae IV and V, above, can be accomplished in situ by simply adding zinc dust to a solution of an oxime (having R as limited) dissolved in a lower alkanoic acid, preferably acetic acid.

The 4-methyl-2-variable diester of 5-methyl-3-variable'-2,4-pyrroledicarboxylic acids (compounds according to Formula I) are also prepared by esterifying the 2-carboxyl group of the 4-methyl ester of a 5-methyl-3-variable'-2,4-pyrroledicarboxylic acid. The desired esterification can be accomplished by reacting the 2-carboxylic compound with a desired alcohol moiety in the presence of trifluoroacetic anhydride.

Alternatively, the acid chloride or bromide of the 4-methyl ester of a 5-methyl-3-variable'-2,4-pyrroledicarboxylic acid can be prepared and then reacted with a desired alcohol in the presence of an acid acceptor, e.g., triethylamine, pyridine, quinoline, and the like. If desired, an inert solvent such as dioxane can be used as the reaction medium.

Certain preferred new compounds in accordance with this invention are the 2-alkyl-4-methyl diesters of 5-methyl-3-variable''-2,4-pyrroledicarboxylic acids of the formula:

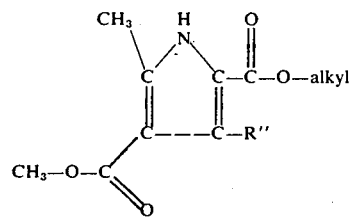

wherein "alkyl" is of from 2 to 12 carbon atoms as defined and R'' is defined. A particular preferred subgroup includes compounds wherein "alkyl" is ethyl, isopropyl, isobutyl, sec-butyl, neopentyl, 1-ethylpropyl, and 1-methylheptyl.

Another group of preferred new compounds in accordance with this invention is the 2-haloalkyl-4-methyl diesters of 5-methyl-3-variable'-2,4-pyrroledicarboxylic acids of the formula

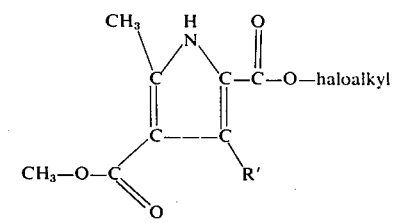

wherein "haloalkyl" is of from 2 to 12 carbon atoms as defined, and R' is as defined. A particularly preferred subgroup is those compounds wherein "haloalkyl" is 2,2,2-trifluoroethyl, 2,2,2-trifluoro-1-(trifluoromethyl)-ethyl, and 2,2,3,3,3-pentafluoropropyl.

The following descriptions of preparations of compounds according to this invention, and description of their use in the method and compositions of the invention are illustrative of the scope of the invention contemplated but they are not limiting. Variations and extensions thereof are within the skill of those practicing in the pertinent arts.

Preparation I

Acid Chloride of 3,5-Dimethyl-2,4-Pyrroledicarboxylic Acid, 4-Methyl Ester

A solution consisting of 16.8 g. (0.085 mole) 4-methyl ester of 3,5-dimethyl-2,4-pyrroledicarboxylic acid and 400 ml. acetyl chloride was heated at the reflux temperature for 30 min. After cooling the reaction mixture to about 25° C., the precipitate that formed was collected on a filter. The filter cake was washed with hexane and dried to give 12.7 g. of the acid chloride of 3,5-dimethyl- 2,4-pyrroledicarboxylic acid, 4-methyl ester.

Following the same procedure but substituting 4-methyl ester of 5-methyl-3-trifluoromethyl-2,4-pyrroledicarboxylic acid, 4-methyl ester of 3-ethyl-5-methyl-2,4-pyrroledicarboxylic acid, 4-methyl ester of 5-methyl-3-propyl-2,4-pyrroledicarboxylic acid, and 4-methyl ester of 3-isopropyl-5-methyl-2,4-pyrroledicarboxylic acid for the 4-methyl ester of 3,5-dimethyl-2,4-pyrroledicarboxylic acid there were prepared the corresponding acid chlorides of 4-methyl ester of 5-methyl-3-trifluoromethyl-2,4-pyrroledicarboxylic acid, 4-methyl ester of 3-ethyl-5-methyl-2,4-pyrroledicarboxylic acid,
4-methyl ester of 5-methyl-3-propyl-2,4-pyrroledicarboxylic acid, and
4-methyl ester of 3-isopropyl-5-methyl-2,4-pyrroledicarboxylic acid, respectively.

EXAMPLE 1

Preparation of 2-Ethyl-4-Methyl Diester of 5-Methyl 3-Trifluoromethyl-2,4-Pyrroledicarboxylic Acid A solution of 18.4 g (0.10 mole) ethyl 3-oxo-4,4,4-trifluorobutyrate in 100 ml. acetic acid was cooled at about 3° to 7° C. while a solution consisting of 8.5 g. (0.12 mole) sodium nitrite in 15 ml. water was added dropwise with stirring. The solution thus obtained was stirred for 2 hrs. without cooling in order to complete the formation of the desired ethyl 2-oximido-3-oxo-4,4,4-trifluorobutyrate. After adding 11.6 g. (0.10 mole) methyl acetoacetate to the solution, 20 g. zinc dust was added in small portions. While the zinc dust was being added, the temperature of the reaction mixture was maintained (by cooling) at between 60° and 70° C. After all the zinc dust had been added, the reaction mixture containing ethyl 2-amino-3-oxo-4,4,4-trifluorobutyrate was heated at the reflux temperature for 1 hr. in order to form the desired 2-ethyl-4-methyl diester of 5-methyl-3-trifluoromethyl-2,4-pyrroledicarboxylic acid. The reaction mixture was poured onto one l. crushed ice and set aside for about 16 hrs. The precipitate that formed was collected on a filter, washed with water, and dried. After recrystallizing the filter cake from a mixture of methylene chloride and hexane, there was obtained 10 g. of 2-ethyl-4-methyl diester of 5-methyl-3-trifluoromethyl-2,4-pyrroledicarboxylic acid having a melting point at 105° to 105.5° C.

Analysis: Calc'd. for $C_{11}H_{12}F_3NO_4$: C, 47.31; H, 4.34; F, 20.41; N, 5.02. Found: C, 47.92; H, 4.46; F, 21.86; N, 5.40.

EXAMPLE 2

Preparation of 2-Ethyl-4-Methyl Diester of 3-Ethyl-5-methyl-2,4-Pyrroledicarboxylic Acid Following the procedure of Example 1, but substituting ethyl propionylacetate in the amount of 10 g. (0.07 mole) for the ethyl 3-oxo-4,4,4-trifluorobutyrate; using 200 ml. acetic acid instead of 100 ml.; using 5 g. sodium nitrite in 7 ml. water; 8.12 g. (0.07 mole) methyl acetoacetate; using 15 g. zinc dust instead of 20 g.; and recrystallizing from a mixture of ether and hexane there was prepared 4 g. of 2-ethyl-4-methyl diester of 3-ethyl-5-methyl-2,4-pyrroledicarboxylic acid having a melting point at 110° C.

Analysis: Calc'd. for $C_{12}H_{17}NO_4$: C, 60.24; H, 7.16; N, 5.86. Found: C, 60.41; H, 7.71; N, 6.01.

EXAMPLE 3

Preparation of 2-Ethyl-4-Methyl Diester of 5-Methyl-3-Propyl-2,4-Pyrroledicarboxylic Acid Following the procedure of Example 1, but substituting ethyl butyrylacetate in the amount of 15.8 g. (0.10 mole) for the ethyl 3-oxo-4,4,4-trifluorobutyrate; using 70 ml. acetic acid instead of 100 ml.; using 6.9 g. sodium nitrite in 9 ml. water; using 11.6 g. (0.10 mole) methyl acetoacetate; using 18 g. zinc dust instead of 20 g.; and recrystallizing from technical hexane (a mixture of isomeric hexanes having a boiling range between 146° to 156° F.) there was obtained 10 g of 2-ethyl-4-methyl diester of 5-methyl-3-propyl-2,4-pyrroledicarboxylic acid having a melting point at 104° to 105° C.

Analysis: Calc'd. for $C_{13}H_{19}NO_4$: C, 61.64; H, 7.56; N, 5.53. Found: C, 61.84; H, 7.52; N, 5.71.

Example 4

Preparation of 4-Methyl-2-(2,2,2-Trifluoroethyl) Diester of 3,5-Dimethyl-2,4-Pyrroledicarboxylic Acid A quantity (1.2 g., 0.006 mole) 4-methyl ester of 3,5-dimethyl-2,4-pyrroledicarboxylic acid was added with stirring to a mixture consisting of 10 ml. trifluoroacetic anhydride and 2 ml. 2,2,2-trifluoroethyl alcohol and the reaction mixture was set aside for 20 minutes. After removing the excess anhydride and water of reaction with a stream of nitrogen gas, the residue was extracted several times with benzene. The benzene extracts were combined and the benzene was removed by evaporation under reduced pressure. The solid residue was recrystallized from a mixture of methylene chloride and hexane to give 1.6 g. 4-methyl-2-(2,2,2-trifluoroethyl) diester of 3,5-dimethyl-2,4-pyrroledicarboxylic acid having a melting point at 123° to 124° C.

Analysis: Calc'd. for $C_{11}H_{12}F_3NO_4$: C, 47.31; H, 4.34; F, 20.41; N, 5.02. Found: C, 48.23; H, 4.98; F, 19.79; N, 5.95.

EXAMPLE 5

Preparation of 4-Methyl-2-propyl Diester of 3,5-Dimethyl-2,4-Pyrroledicarboxylic Acid A reaction mixture consisting of 3 g. (0.014 mole) acid chloride of 3,5-dimethyl-2,4-pyrroledicarboxylic acid, 4-methyl ester, 100 ml. propyl alcohol and 2 ml. triethylamine was stirred for about 16 hrs. at a temperature of about 25° C. The reaction mixture was then poured onto crushed ice and water. The precipitate that formed was collected on a filter. The filter cake was washed with water and dried. After recrystallization from petroleum ether there was obtained 2 g. of 4-methyl-2-propyl diester of 3,5-dimethyl-2,4-pyrroledicarboxylic acid having a melting point at 99° to 100° C.

Analysis: Calc'd. for $C_{12}H_{17}NO_4$: C, 60.24; H, 7.16; N, 5.85. Found: C, 60.44; H, 7.59; N, 6.11.

EXAMPLE 6

Preparation of 2-(2-Chloroethyl)-4-Methyl Diester of 3,5-Dimethyl-2,4-Pyrroledicarboxylic Acid Following the procedure of Example 5, but substituting 2-chloroethyl alcohol for propyl alcohol and using a mixture of diethyl ether and hexane for the crystallization solvent, there was prepared 2-(2-chloroethyl)-4-methyl diester of 3,5-dimethyl-2,4-pyrroledicarboxylic acid having a melting point at 128.5° to 129.5° C.

Analysis: Calc'd. for $C_{11}H_{14}ClNO_4$: C, 50.87; H, 5.45; Cl, 13.65; N, 5.40. Found: C, 50.91; H, 5.03; Cl, 14.03; N, 5.31.

EXAMPLE 7

Preparation of 4-Methyl-2-(2,2,3,3,3-pentafluoropropyl) Diester of 3,5-Dimethyl-2,4-Pyrroledicarboxylic Acid Following the procedure of Example 5, but substituting 4.2 g. (0.028 mole) 2,2,3,3,3-pentafluoropropyl alcohol and 12 ml. dioxane (as solvent) for the 100 ml. propyl alcohol, chromatographing the product on silica gel using a benzene: ethyl acetate = 4:1 mixture, and recrystallizing from a mixture of ether and petroleum ether, there was prepared 4-methyl-2-(2,2,3,3,3-pentafluoropropyl) diester of 3,5-dimethyl-2,4-pyrroledicarboxylic acid having a melting point of 108° to 109.5° C.

Analysis: Calc'd. for $C_{12}H_{12}F_5NO_4$: C, 43.77; H, 3.68; F, 28.85. Found: C, 44.12; H, 4.23; F, 28.80.

EXAMPLE 8

Preparation of 2-(2-Bromoethyl)-4-Methyl Diester of 3,5-Dimethyl-2,4-Pyrroledicarboxylic Acid Following the procedure of Example 5, but substituting 2-bromoethyl alcohol for propyl alcohol and recrystallizing the product from a mixture of diethyl ether and petroleum ether, there was prepared 2-(2-bromoethyl)-4-methyl diester of 3,5-dimethyl-1,4-pyrroledicarboxylic acid having a melting point at 129° to 130° C.

Analysis: Calc'd. for $C_{11}H_{14}BrNO_4$: C, 43.43; H, 4.65; Br, 26.27; N, 4.61. Found: C, 44.33; H, 4.74; Br, 25.70; N, 4.71.

EXAMPLE 9

Preparation of 2-(2,2,2-Trichloroethyl)-4-Methyl Diester of 3,5-Dimethyl-2,4-Pyrroledicarboxylic Acid Following the procedure of Example 5, but substituting 1.35 ml. 2,2,2-trichloroethyl alcohol and 20 ml. diethyl ether as solvent for the 100 ml. of propyl alcohol and recrystallizing the product from a mixture of methylene chloride and hexane, there was prepared 2-(2,2,2-trichloroethyl)-4-methyl diester of 3,5-dimethyl-2,4-pyrroledicarboxylic acid having a melting point at 136° to 137° C.

Analysis: Calc'd. for $C_{11}H_{12}Cl_3NO_4$: C, 40.21; H, 3.69; Cl, 32.37; N, 4.26. Found: C, 40.61; H, 3.82; Cl, 32.08; N, 4.59.

EXAMPLE 10

Preparation of 2-(2-Methoxyethyl)-4-Methyl Diester of 3,5-Dimethyl-2,4-Pyrroledicarboxylic Acid Following the procedure of Example 5, but substituting 2-methoxyethyl alcohol for propyl alcohol and recrystallizing the product from hexane, there was prepared 2-(2-methoxy- 4-methyl diester of 3,5-dimethyl-2,4-pyrroledicarboxylic acid having a melting point at 85° to 90° C.

Analysis: Calc'd. for $C_{12}H_{17}NO_5$: C, 56.46; H, 6.71; N, 5.49. Found: C, 56.49; H, 6.56; N, 5.67.

EXAMPLE 11

Preparation of 2-Isopropyl-4-Methyl Diester of 3,5-Dimethyl-2,4-Pyrroledicarboxylic Acid Following the procedure of Example 5, but substituting isopropyl alcohol for propyl alcohol and recrystallizing the product from a mixture of diethyl ether and petroleum ether, there was prepared 2-isopropyl-4-methyl diester of 3,5-dimethyl-2,4-pyrroledicarboxylic acid having a melting point at 149.5° to 150.5° C.

Analysis:
Calc'd. for $C_{12}H_{17}NO_4$: C, 60.24; H, 7.16; N, 5.83. Found: C, 60.46; H, 7.13; N, 6.05.

EXAMPLE 12

Preparation of 4-Methyl 2-[2,2,2,-Trifluoro-1-(Trifluoromethyl)ethyl] Diester of 3,5-Dimethyl-2,4-Pyrroledicarboxylic Acid Following the procedure of Example 4, but substituting hexafluoroisopropyl alcohol for 2,2,2-trifluoroethyl alcohol and recrystallizing the product from a mixture of benzene and hexane, there was prepared 4-methyl 2-(2,2,2-trifluoro-1-(trifluoromethyl)ethyl] diester of 3,5-dimethyl-2,4-pyrroledicarboxylic acid having a melting point at 148° to 150° C.

Analysis: Calc'd. for $C_{12}H_{11}F_6NO_4$: C, 41.51; H, 3.19; F, 32.90. Found: C, 41.73; H, 3.41; F, 33.11.

EXAMPLE 13

Preparation of 2-Butyl-4-Methyl Diester of 3,5-Dimethyl-2,4-Pyrroledicarboxylic Acid Following the procedure of Example 5, but substituting butyl alcohol for propyl alcohol and recrystallizing the product from a mixture of diethyl ether and petroleum ether, there was prepared 2-butyl-4-methyl diester of 3,5-dimethyl-2,4-pyrroledicarboxylic acid having a melting point at 87.5° to 88.5° C.

Analysis: Calc'd. for $C_{13}H_{19}NO_4$: C, 61.64; H, 7.56; N, 5.33. Found: C, 61.71; H, 7.34; N, 5.61.

EXAMPLE 14

Preparation of 2-sec-Butyl-4-Methyl Diester of 3,5-Dimethyl-2,4-Pyrroledicarboxylic Acid Following the procedure of Example 5, but substituting sec-butyl alcohol for propyl alcohol and recrystallizing the product from methyl alcohol, there was prepared 2-sec-butyl-4-methyl diester of 3,5-dimethyl-2,4-pyrroledicarboxylic acid having a melting point at 145° to 146° C.

Analysis: Calc'd. for $C_{13}H_{19}NO_4$: C, 61.64; H, 7.56; N, 5.53. Found: C, 61.79; H, 7.66; N, 5.68.

EXAMPLE 15

Preparation of 2-Isobutyl-4-Methyl Diester of 3,5-Dimethyl-2,4-Pyrroledicarboxylic Acid Following the procedure of Example 5, but substituting isobutyl alcohol for propyl alcohol and recrystallizing the product from methanol, there was prepared 2-isobutyl-4-methyl diester of 3,5-dimethyl-2,4-pyrroledicarboxylic acid, having a melting point at 129° to 130° C.

Analysis: Calc'd. for $C_{13}H_{19}NO_4$: C, 61.64; H, 7.56; N, 5.53. Found: C, 61.60; H, 7.58; N, 5.77.

EXAMPLE 16 preparation of 2-tert-Butyl-4-Methyl Diester of 3,5-Dimethyl-2,4Pyrroledicarboxylic Acid Following the procedure of Example 5, but substituting tert-butyl alcohol for propyl alcohol and recrystallizing the product from a mixture of diethyl ether and petroleum ether, there was prepared 2-tert-butyl-4-methyl diester of 3,5-dimethyl-2,4-pyrroledicarboxylic acid having a melting point at 144° to 145° C.

Analysis: Calc'd. for $C_{13}H_{19}NO_4$: C, 61.64; H, 7.56; N, 5.53. Found: C, 61.51; H, 7.20; N, 5.75.

EXAMPLE 17

Preparation of 4-Methyl-2-Neopentyl Diester of 3,5-Dimethyl-2,4-Pyrroledicarboxylic Acid Following the procedure of Example 5, but substituting neopentyl alcohol for propyl alcohol and recrystallizing the product from methyl alcohol, there was prepared 4-methyl-2-neopentyl diester of 3,5-dimethyl-2,4-pyrroledicarboxylic acid having a melting point at 132° to 133° C.

Analysis: Calc'd. for $C_{14}H_{21}NO_4$: C, 62.90; H, 7.92; N, 5.24. Found: C, 62.46; H, 8.02; N, 5.12.

EXAMPLE 18

Preparation of 4-Methyl-2-tert-Pentyl Diester of 3,5-Dimethyl-2,4-Pyrroledicarboxylic Acid Following the procedure of Example 5, but substituting tert-pentyl alcohol for propyl alcohol and recrystallizing the product from methyl alcohol, there was prepared 4-methyl-2-tert-pentyl diester of 3,5-dimethyl-2,4-pyrroledicarboxylic acid having a melting point at 98° to 100° C.

Analysis: Calc'd. for $C_{14}H_{21}NO_4$: C, 62.83; H, 8.04; N, 5.09. Found: C, 62.83; H, 7.96; N, 5.24.

EXAMPLE 19

Preparation of 2-Cyclohexyl-4-Methyl Diester of 3,5-Dimethyl-2,4-Pyrroledicarboxylic Acid Following the procedure of Example 5, but substituting cyclohexyl alcohol for propyl alcohol and recrystallizing the product from a mixture of diethyl ether, methylene chloride and hexane, there was prepared 2-cyclohexyl-4-methyl diester of 3,5-dimethyl-2,4-pyrroledicarboxylic acid, having a melting point at 156° to 157° C.

Analysis: Calc'd. for $C_{15}H_{21}NO_4$: C, 64.49; H, 7.58; N, 5.01. Found: C, 64.52; H, 7.03; N, 5.78.

EXAMPLE 20

Preparation of 2-Allyl-4-Methyl Diester of 3,5-Dimethyl-2,4-Pyrroledicarboxylic Acid Following the procedure of Example 5, but substituting allyl alcohol for propyl alcohol and recrystallizing the product from a mixture of diethyl ether and petroleum ether, there was prepared 2-allyl-4-methyl diester of 3,5-dimethyl-2,4-pyrroledicarboxylic acid having a melting point at 113° C.

Analysis: Calc'd. for $C_{12}H_{15}NO_4$: C, 60.75; H, 6.37; N, 5.90. Found: C, 60.78; H, 6.00; N, 5.82.

EXAMPLE 21

Following the procedure of Example 5, but substituting
  2,2-difluoroethyl alcohol,
  3,3,3-triiodopropyl alcohol,
  2,2,2-trifluoro-1-methylethyl alcohol,
  2,2,3,3-tetrafluoro-1,1-dimethylpropyl alcohol,
  2,3-dibromobutyl alcohol,
  3,3-dibromodecyl alcohol,
  8-fluorooctanol,
  1-ethylpropenyl alcohol,
  2-butenyl (crotyl) alcohol,
  5-hexenol,
  2,4-hexadienol,
  1-methylheptenyl alcohol,
  2-chloroallyl alcohol,
  3-chloro-2-butenyl alcohol,
  2-chloro-3-fluoroallyl alcohol,
  3,3-dichloro-2-methylallyl alcohol,
  2,3,3-trichloroallyl alcohol,
  4-chloro-2-octenol,
  cyclobutyl alcohol,
  1-methylcyclopentanol,
  2-methylcyclohexanol,
  2-isopropyl-5-methylcyclohexanol,
  cyclopropylmethyl alcohol,
  3-cyclohexylpropyl alcohol,
  2-chlorocyclohexanol,
  4-chlorocyclohexanol,
  1,3,4,5,6-pentachlorocyclohexene-1-ol,
  3-chlorocyclopenten-1-ol,
  3-bromocyclohexen-1-ol,
  5-methyl-2-cyclohexen-1-ol,
  2-ethoxyethyl alcohol,
  2-isopropoxyethyl alcohol,
  2-butoxyethyl alcohol,
  1-methyl-2-methoxyethyl alcohol,
  1,1-dimethyl-2-methoxyethyl alcohol,
  3-methoxypropyl alcohol,
  1-methyl-3-methoxybutyl alcohol,
  4-ethoxy-n-hexyl alcohol,
  n-propoxyamyl alcohol,
  1-methoxyisobutyl alcohol, and
  2-methoxyoctanol for propyl alcohol,
there is prepared the corresponding
  2-(2,2-difluoroethyl)-4-methyl diester of 3,5-dimethyl-2,4-pyrroledicarboxylic acid,
  4-methyl-2-(3,3,3-triiodopropyl) diester of 3,5-dimethyl-2,4pyrroledicarboxylic acid,
  4-methyl-2-(2,2,2-trifluoro-1-methylethyl) diester of 3,5-dimethyl-2,4-pyrroledicarboxylic acid,
  4-methyl-2-(2,2,3,3-tetrafluoro-1,1-dimethylpropyl) diester of 3,5-dimethyl-2,4-pyrroledicarboxylic acid,
  2-(2,3-dibromobutyl)-4-methyl diester of 3,5-dimethyl-2,4-pyrroledicarboxylic acid,
  2-(3,3-dibromodecyl)-4-methyl diester of 3,5-dimethyl-2,4-pyrroledicarboxylic acid,
  2-(8-fluorooctyl)-4-methyl diester of 3,5-dimethyl-2,4-pyrroledicarboxylic acid,
  2-(1-ethylpropenyl)-4-methyl diester of 3,5-dimethyl-2,4-pyrroledicarboxylic acid,
  2-(2-butenyl)-4-methyl diester of 3,5-dimethyl-2,4-pyrroledicarboxylic acid,
  2-(5-hexenyl)-4-methyl diester of 3,5-dimethyl-2,4-pyrroledicarboxylic acid,
  2-(2,4-hexadienyl)-4-methyl diester of 3,5-dimethyl-2,4-pyrroledicarboxylic acid,
  4-methyl-2-(1-methylheptenyl) diester of 3,5-dimethyl-2,4-pyrroledicarboxylic acid,
  2-(2-chloroallyl)-4-methyl diester of 3,5-dimethyl-2,4-pyrroledicarboxylic acid,
  2-(3-chloro-2-butenyl)-4-methyl diester of 3,5-dimethyl-2,4-pyrroledicarboxylic acid,
  2-(2-chloro-3-fluoroallyl)-4-methyl diester of 3,5-methyl-2,4-pyrroledicarboxylic acid,
  2-(3,3-dichloro-2-methylallyl)-4-methyl diester of 3,5-methyl-2,4-pyrroledicarboxylic acid,
  4-methyl-2-(2,3,3-trichloroallyl) diester of 3,5-methyl-2,4-pyrroledicarboxylic acid,
  2-(4-chloro-2-octenyl)-4-methyl diester of 3,5-dimethyl-2,4-pyrroledicarboxylic acid,
  2-cyclobutyl-4-methyl diester of 3,5-dimethyl-2,4-pyrroledicarboxylic acid, 4-methyl-2-(1-methylcyclopentyl) diester of 3,5-dimethyl-2,4-pyrroledicarboxylic acid, 4-methyl-2-(2-methylcyclohexyl) diester of 3,5-dimethyl-2,4-pyrroledicarboxylic acid, 2-(2-isopropyl-5-methylcyclohexyl)-4-methyl diester of 3,5-dimethyl-2,4-pyrroledicarboxylic acid, 2-cyclopropylmethyl-4-methyl diester of 3,5-dimethyl-2,4-pyrroledicarboxylic acid, 2-(3-cyclohexylpropyl)-4-methyl diester of 3,5-dimethyl-2,4-pyrroledicarboxylic acid, 2-(2-chlorocyclohexyl)-4-methyl diester of 3,5-dimethyl-2,4-pyrroledicarboxylic acid, 2-(4-chlorocyclohexyl)-4-methyl diester of 3,5-dimethyl-2,4-pyrroledicarboxylic acid, 4-methyl-2-(1,3,4,5,6-pentachlorocyclohexen-1-yl) diester of 3,5-dimethyl-2,4-pyrroledicarboxylic acid, 2-(3-chlorocyclopenten-1-yl)-4-methyl diester of 3,5-dimethyl-2,4-pyrroledicarboxylic, 2-(3-bromocyclohexen-1-yl)-4-methyl diester of 3,5-dimethyl-2,4-pyrroledicarboxylic acid, 4-methyl-2-(5-methyl-2-cyclohexen-1-yl) diester of 3,5-dimethyl-2,4-pyrroledicarboxylic acid, 2-(2-ethoxyethyl)-4-methyl diester of 3,5-dimethyl-2,4-pyrroledicarboxylic acid, 2-(2-isopropoxyethyl)-4-methyl diester of 3,5-dimethyl-2,4-pyrroledicarboxylic acid, 2-(2-butoxyethyl)-4-methyl diester of 3,5-dimethyl-2,4-pyrroledicarboxylic acid, 4-methyl-2-(1-methyl-2-methoxyethyl) diester of 3,5-dimethyl-2,4-pyrroledicarboxylic acid, 2-(1,1-dimethyl-2-methoxyethyl)-4-methyl diester of 3,5-dimethyl-2,4-pyrroledicarboxylic acid, 2-(3-methoxypropyl)-4-methyl diester of 3,5-dimethyl-2,4-pyrroledicarboxylic acid, 4-methyl-2-(1-methyl-3-methoxybutyl) diester of 3,5-dimethyl-2,4-pyrroledicarboxylic acid, 2-(4-ethoxy-n-hexyl)-4-methyl diester of 3,5-dimethyl-2,4-pyrroledicarboxylic acid, 4-methyl-2-(n-propoxyamyl) diester of 3,5-dimethyl-2,4-pyrroledicarboxylic acid, 2-(1-methoxyisobutyl)-4-methyl diester of 3,5-dimethyl-2,4-pyrroledicarboxylic acid, and 2-(2-methoxyoctyl)-4-methyl diester of 3,5-dimethyl-2,4-pyrroledicarboxylic acid, respectively.

EXAMPLE 22

Following the procedure of Example 5, but substituting
2-fluoroethyl alcohol,
2-iodoethyl alcohol,
2,2-dibromopropyl alcohol,
3-chloropropyl alcohol, and
4-chlorobutyl alcohol for propyl alcohol
there are prepared
2-(2-fluoroethyl)-4-methyl diester of 3,5-dimethyl-2,4-pyrroledicarboxylic acid,
2-(2-iodoethyl)-4-methyl diester of 3,5-dimethyl-2,4-pyrroledicarboxylic acid,
4-methyl-2-(2,2-dibromopropyl) diester of 3,5-dimethyl-2,4-pyrroledicarboxylic acid,
4-methyl-2-(3-chloropropyl) diester of 3,5-dimethyl-2,4-pyrroledicarboxylic acid, and
2-(4-chlorobutyl)-4-methyl diester of 3,5-dimethyl-2,4-pyrroledicarboxylic acid, respectively.

EXAMPLE 23

Alternative preparation of 4-Methyl-2-Isopropyl Diester of 3,5-Dimethyl-2,4-Pyrroledicarboxylic Acid Sodium metal (30 g.) was dissolved in 2 l. isopropyl alcohol, and to the solution was added 125 g. 2-ethyl-4-methyl diester of 3,5-dimethyl-2,4-pyrroledicarboxylic acid. The resulting solution was heated at the reflux temperature for 4 hrs. After cooling, water (about 2 l.) was added to the reaction solution and the solid that precipitated was collected on a filter, washed with water, and dried. The dried solid (95 g.) was recrystallized twice from a mixture of benzene and hexane to afford 55 g. of 4-methyl-2-isopropyl diester of 3,5-dimethyl-2,4-pyrroledicarboxylic acid having a melting point at 149° to 151°C.

EXAMPLE 24

Preparation of 2-Isopropyl-4-Methyl Diester of 3-Ethyl-5-Methyl-2,4-Pyrroledicarboxylic Acid Following the procedure of Example 23, but substituting 2-ethyl-4-methyl diester of 3-ethyl-5-methyl-2,4-pyrroledicarboxylic acid for 2-ethyl-4-methyl diester of 3,5-dimethyl-2,4-pyrroledicarboxylic acid, there was prepared 2-isopropyl-4-methyl diester of 3-ethyl-5-methyl-2,4-pyrroledicarboxylic acid having a melting point at 85° to 87° C.

Analysis: Calc'd. for $C_{13}H_{19}NO_4$: C, 61.64; H, 7.56; N, 5.53. Found: C, 61.69; H, 7.69; N, 5.92.

EXAMPLE 25

Preparation of 2-Isopropyl-4-Methyl Diester of 5-Methyl-3-Propyl-2,4-Pyrroledicarboxylic Acid Following the procedure of Example 23, but substituting 2-ethyl-4-methyl diester of 5-methyl-3-propyl-2,4-pyrroledicarboxylic acid for 2-ethyl-4-methyl diester of 3,5-dimethyl-2,4-pyrroledicarboxylic acid, there was prepared 4-methyl-2-isopropyl diester of 5-methyl-3-propyl-2,4-pyrroledicarboxylic acid having a melting point at 105° to 109° C.

Analysis: Calc'd. for $C_{14}H_{21}NO_4$: C, 62.90; H, 7.92; N, 5.24. Found: C, 63.02; H, 7.82; N, 5.67.

EXAMPLE 26

Preparation of 2-(1-Ethylpropyl)-4-Methyl Diester of 3,5-Dimethyl-2,4-Pyrroledicarboxylic Acid Following the procedure of Example 1, but substituting (1-ethylpropyl) acetoacetate for methyl acetoacetate, there is prepared 2-(1-ethylpropyl)-4-methyl diester of 3,5-dimethyl-2,4-pyrroledicarboxylic acid having a melting point at 99° to 101° C.

EXAMPLE 27

Preparation of 4-Methyl-2-(1-Methylheptyl) Diester of 3,5-Dimethyl-2,4-Pyrroledicarboxylic Acid Following the procedure of Example 1, but substituting (1-methylheptyl) acetoacetate for methyl acetoacetate, there is prepared 4-methyl-2-(1-methylheptyl) diester of 3,5-dimethyl-2,4-pyrroledicarboxylic acid as an oil.

EXAMPLE 28

Preparation of 4-Methyl-2-Octyl Diester of 3,5-Dimethyl-2,4-Pyrroledicarboxylic Acid Following the procedure of Example 1, but substituting octyl acetoacetate for methyl acetoacetate there is prepared 4-methyl-2-octyl diester of 3,5-dimethyl-2,4-pyrroledicarboxylic acid having a melting point at 74° to 77° C.

Analysis: Calc'd. for $C_{17}H_{27}NO_4$: C, 65.99; H, 8.80; N, 4.53. Found: C, 65.86; H, 8.91; N, 4.46.

EXAMPLE 29

Preparation of 2-Dodecyl-4-Methyl Diester of 3,5-Dimethyl-2,4-Pyrroledicarboxylic Acid Following the procedure of Example 1, but substituting dodecyl acetoacetate for methyl acetoacetate, there is prepared 2-dodecyl-4-methyl diester of 3,5-dimethyl-2,4-pyrroledicarboxylic acid having a melting point at 70° to 72° C.

Analysis: Calc'd. for $C_{21}H_{35}NO_4$: C, 69.00; H, 9.65; N, 3.89. Found: C, 68.97; H, 9.85; N, 3.79.

EXAMPLE 30

Preparation of 2-Ethyl-4-Methyl Diester of 5-Methyl-2,4-Pyrroledicarboxylic Acid To a solution of methyl ester of 2-methyl-3-pyrrolecarboxylic acid (18 g., 0.13 mole) in toluene (150 ml.) was added phosgene (25 ml. of the liquified gas). The reaction solution was set aside at 25° C. for 24 hrs., and was then heated at 90° C. for 2 hrs. The toluene and volatile components were then removed by evaporation at reduced pressure and the oil thus obtained was dissolved in ethyl alcohol (50 ml.). After 2 days the ethyl alcohol was removed by evaporation and the solid that remained was recrystallized from a mixture of methylene chloride and hexane. There was thus obtained 6.5 g. of 2-ethyl-4-methyl diester of 5-methyl-2,4-pyrroledicarboxylic acid having a melting point at 158° to 159° C.

Analysis: Calc'd. for $C_{10}H_{13}NO_4$: C, 56.86; H, 6.20; N, 6.63. Found: C, 56.76; H, 6.21; N, 6.54.

EXAMPLE 31

Following the procedure of Example 30, but substituting 2,2,2-trifluoroethyl alcohol, isopropyl alcohol, isobutyl alcohol, tert butyl alcohol and neopentyl alcohol for ethyl alcohol there are prepared 2-(2,2,2-trifluoroethyl)-4-methyl diester of 5-methyl-2,4-pyrroledicarboxylic acid, 4-methyl-2-isopropyl diester of 5-methyl-2,4-pyrroledicarboxylic acid, 2-isobutyl-4-methyl diester of 5-methyl-2,4-pyrroledicarboxylic acid, 2-tert-butyl-4-methyl diester of 5-methyl-2,4-pyrroledicarboxylic acid, and 4-methyl-2-neopentyl diester of 5-methyl-2,4-pyrroledicarboxylic acid, respectively.

For purposes according to the method of this invention, 4-methyl-2-variable diester of 5-methyl-3-variable'-2,4-pyrroledicarboxylic acid (compound according to Formula I) is formulated in herbicidal compositions. Such compositions in accordance with the invention include solutions, emulsions, suspensions, dispersible powders, emulsifiable concentrates, granular formulations, and dusts. All of these compositions comprise the compound in dispersed or readily dispersible form and a dispersible carrier, with or without adjuvants. In general, selective inhibition of undesired weed species in the presence of desired plants, e.g., field agronomic or horticultural crops, or in turf is obtained by employing a phytonomic carrier, that is to say, a carrier which can be applied to plants without phytotoxicity or other adverse effects. On the other hand, when general herbicidal activity is desired a phytotoxic carrier, for example, high-boiling petroleum fractions such as kerosene can be used.

The efficacy of 4-methyl-2-variable diester of 5-methyl-3-variable'-2,4-pyrroledicarboxylic acid as a herbicide is of high order, and the compound can be applied at relatively low rates per acre for controlling growth of weed plants, e.g., germinating weed seeds and weed seedlings. Illustratively, the compounds 2-ethyl-4-methyl diester of 5-methyl-3-trifluoromethyl-2,4-pyrroledicarboxylic acid, 2-ethyl-4-methyl diester of 3-ethyl-5-methyl-2,4-pyrroledicarboxylic acid, 2-ethyl-4-methyl diester of 5-methyl-3-propyl-2,4-pyrroledicarboxylic acid, 4-methyl-2-(2,2,2-trifluoroethyl) diester of 3,5-dimethyl-2,4-pyrroledicarboxylic acid, 4-methyl-2-propyl diester of 3,5-dimethyl-2,4-pyrroledicarboxylic acid, 2-(2-chloroethyl)-4-methyl diester of 3,5-dimethyl-2,4-pyrroledicarboxylic acid, and 4-methyl-2-(2,2,3,3,3-pentafluoropropyl) diester of 3,5-dimethyl-2,4-pyrroledicarboxylic acid, gave complete or substantially complete suppression of buckhorn plantain (*Plantago lanceolata* L.), common purslane (*Portulaca oleracea* L.), yellow foxtail (*Setaria glauca* L.), bindweed (*Convolvulus arvensis*), lambsquarters (*Chenopodium album*), and red sorrel (sheep sorrel) (*Rumex acetosella* L.), when applied at rates of about 6 lbs. per acre. Rates of application of about 0.5 to about 15 lbs. per acre are efficacious under usual conditions, depending upon the particular circumstances such as type of soil, amount of rainfall or irrigation, and the most prevalent kinds of weeds. At the high rates of application, e.g., at 20 to 50 lbs. per acre the compound acts as a soil sterilant.

Illustratively, excellent control of weeds in rice fields has been obtained, without significant damage to the rice plants, using concentrations of 4-methyl-2-variable diester of 5-methyl-3-variable'-2,4-pyrroledicarboxylic acid, ranging from about 1000 ppm (parts per million) to about 5000 ppm applied at the rates of about 1 lb. to about 3.0 lbs. per acre. In general, a desired rate of application can be achieved by distributing, over the area to be treated, an aqueous composition in accordance with the invention, containing from about 700 ppm to about 30,000 ppm of active ingredient. It will be understood, of course, that a choice of concentration of active ingredient depends upon the method of application as well as the type of composition and the degree of herbicidal control desired. In general, concentration is not critical within the range indicated since an effective quantity of active ingredient can be applied to a given area by applying greater quantities of a low concentration than of a higher concentration. The concentration of active ingredient in the dispersible powder and emulsifiable concentrates from which the aqueous compositions are prepared can be as high as 99.5% by weight. The concentration of active ingredient in the dust and granular formulations of the invention can vary from about 0.25 to about 80% or more, but advantageously is of the order of 0.50 to 20%.

The granular formulations of this invention are prepared with about 0.25 to about 80%, preferably 0.50 to 20% by weight, of active ingredient and a granular carrier, for example, vermiculite, pyrophyllite, or attapulgite. The active ingredient can be dissolved in a volatile solvent such as methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25 to about 80% by weight, preferably 0.50 to 20% of the active ingredient with a solid pulverulent carrier which maintains the composition in a dry, free-flowing condition. The herbicidal dusts of the invention can be prepared by admixing the compound with a solid diluent and then milling. Preferably, however, the active ingredient is dissolved in a volatile organic solvent, of the kinds indicated above, and then sprayed on the solid carrier so as to assure thorough distribution. The mixture is then dried and milled to the desired size, e.g., less than about 60 microns.

Solid carriers that can be used in the dust compositions of the invention include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the composition also include solid, compounded fertilizers. Such solid compositions can be applied to vegetation in the form of dusts by the use of conventional equipment.

A preferred composition, in accordance with the invention, is a dispersible powder which is prepared by incorporating a surfactant in a dust composition prepared as described above. Such a dispersible powder can be dispersed in water to any desired concentration and applied to vegetation by conventional spray equipment. Conveniently, the dispersible powders are formulated with higher concentrations of active ingredient than the dust compositions, for example, up to about 90%, preferably about 10 to 80%. Surfactants useful in preparing such dispersible powder compositions include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 235 lbs. of Georgia Clay, 5.5 lbs. of isooctylphenoxy polyethoxy ethanol (Triton X-100) as a wetting agent, 9.5 lbs. of a polymerized sodium salt of substituted benzoid long-chain sulfonic acid (Daxad 27) as a dispersing agent, and 250 lbs. of the active ingredient. The resulting formulation has the following percentage composition (parts herein are by weight unless otherwise specified).

| | |
|---|---|
| Active ingredient | 50 % |
| Isooctylphenoxy polyethoxy ethanol | 1.1% |
| Polymerized sodium salt of substituted benzoid long-chain sulfonic acid | 1.9% |
| Georgia Clay | 47 % |

This formulation, when dispersed in water at the rate of 10 lbs. per 100 gals., gives a spray formulation containing about 0.6% (6000 ppm) active ingredient which can be applied to soil, plant growth media, growing plants, e.g., turf at the rate of 40 gals. per acre to give a total application of active ingredient of 2 lbs. per acre.

The compounds of this invention can be applied to soil, plants, plant growth media, growing plants, e.g., turf in aqueous sprays without a solid carrier. However, since the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as acetone is used the solvent carrier will dissolve in the water and any excess according to Formula I will be thrown out of solution. In an emulsion, the solvent phase is dispersed in the water phase and the active ingredient is held in solution in the dispersed phase. In this way, uniform distribution of active ingredient with an aqueous spray can be achieved.

A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing germination of undesired seeds and controlling growth of plants.

The emulsifiable concentrates of the invention are prepared by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed if desired.

Advantageously, the concentration of active ingredient in the emulsifiable concentrates can range from about 5 to about 50% by weight, preferably from about 10 to 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 ppm of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include solubilized lignins, such as calcium lignosulfonate, and the like.

Further in accordance with this invention, certain formulations of 4-methyl-2-variable diesters of 5-methyl-3-variable'-2,4-pyrroledicarboxylic acids with oil are particularly efficacious, and herbicidal action of the compound is improved. Any petroleum oil can be used so long as it is not so viscous as to be too difficult to disperse. A non-phytotoxic oil is satisfactory.

Advantageously, a 50% wettable powder of the herbicidal active ingredient is mixed with about 38 gals. water and 2 gals. oil for spray application. Alternatively, about 2 gals. oil and a 50% wettable powder are premixed and then dispersed in about 38 gals. water for spray application. In field tests, oil formulations of the foregoing type have given improved herbicidal action.

The rates of application to soils, plant growth media, growing plants, e.g., turf to be protected from noxious weeds will depend upon the species of vegetation to be controlled, the presence or absence of desirable species, the season of year at which treatment is undertaken, and the method and efficiency of application. In general, selective herbicidal activity is obtained when the compounds are applied at the rate of about 1.0 to about 15 lbs. per acre, preferably at the rate of about 1.0 to about 8 lbs. per acre.

The compositions containing 4-methyl-2-variable diester of 5-methyl-3-variable'-2,4-pyrroledicarboxylic acid can be applied to soil, plant growth media, growing plants, e.g., turf by conventional methods. For example, an area of soil can be treated prior to or after seeding by spraying wettable powder suspensions, emulsions or solutions from boom-type power sprayers or from hand-operated knapsack sprayers. Dusts can be applied by powder dusters, or by hand-operated dusters. Dusts and granular formulations can also be applied at the time of seeding in bands spanning the seeded rows.

The following examples are illustrative of the method and formulations of the present invention, but are not to be construed as limiting.

EXAMPLE 32

A dispersible powder concentrate having the following percentage composition:

| | |
|---|---|
| 2-ethyl-4-methyl diester of 3-ethyl-5-methyl-2,4-pyrroledicarboxylic acid | 45.8% |
| Polymerized sodium salt of substituted benzoid long-chain sulfonic acid (Daxad 27) | 9.2% |
| Kaolinite | 45.0% | was prepared by mixing 250 g. of 2-ethyl-4-methyl diester of 3-ethyl-5-methyl-2,4-pyrroledicarboxylic acid, 50 g. of a polymerized sodium salt of substituted benzoid long-chain sulfonic acid (Daxad 27), and 245 g. of kaolinite. The mixture was milled to a particle size averaging 5 to 30 microns. It was suspended in 10 gals. of water, giving an aqueous spray containing about 6500 parts per million of active ingredient.

EXAMPLE 33

A fine granular formulation having the following percentage composition:

| | |
|---|---|
| 4-methyl-2-propyl diester of 3,5-dimethyl-2,4-pyrroledicarboxylic acid | 3.7% |
| Vermiculite (30/60 mesh) | 96.3% | was prepared by spraying a solution of 220 g. of 4-methyl-2-propyl diester of 3,5-dimethyl-2,4-pyrroledicarboxylic acid in 1000 ml. of methylene chloride onto 5780 g. of vermiculite (30 to 60 mesh) while the vermiculite was being tumbled and stirred so as to assure even distribution. The methylene chloride was then evaporated, leaving the active compound absorbed on the vermiculite, and the vermiculite was pulverized.

EXAMPLE 34

An emulsifiable concentrate having the following percentage composition:

| | |
|---|---|
| 2-ethyl-4-methyl diester of 5-methyl-3-propyl-2,4-pyrroledicarboxylic acid | 15.0% |
| Technical alkyl naphthalene boiling at 238° to 293° C. (Velsicol AR50) | 19.7% |
| Xylene | 17.4% |
| Acetone | 17.4% |
| Ethylene dichloride | 25.4% |
| Blend of alkyl aryl sulfonates and alkylphenoxy polyethoxy ethanols (Triton X-151) | 5.1% | was prepared by mixing 15.0 lbs. of 2-ethyl-4-methyl diester of 5-methyl-3-propyl-2,4-pyrroledicarboxylic acid, 19.7 lbs. of Velsicol AR50, 17.4 lbs. of xylene, 17.4 lbs. of acetone, 25.4 lbs. of ethylene dichloride, and 5.1 lbs. of Triton X-151.

6.67 lbs. of the concentrate mixed with 10 gals. of water gave a spray emulsion containing about 11,000 ppm of active ingredient.

EXAMPLE 35

An emulsifiable concentrate having the following percentage composition:

| | |
|---|---|
| 2-(2-chloroethyl)-4-methyl diester of 3,5-dimethyl-2,4-pyrroledicarboxylic acid | 40.0% |
| Technical alkyl naphthalene boiling at 238° to 293° C. (Velsicol AR50) | 13.7% |
| Xylene | 12.3% |
| Acetone | 11.3% |
| Ethylene dichloride | 17.7% |
| Blend of alkyl aryl sulfonates and alkylphenoxy polyethoxy ethanols (Triton X-151) | 5.0% | was prepared by mixing 40.0 lbs. of 2-(2-chloroethyl)-4-methyl diester of 3,5-dimethyl-2,4-pyrroledicarboxylic acid, 13.7 lbs. of Velsicol AR50, 12.3 lbs. of xylene, 11.3 lbs. of acetone, 17.7 lbs. of ethylene dichloride, and 5.0 lbs. of Triton X-151.

1.67 lbs. of the concentrate mixed with 10 gals of water gave a spray emulsion containing about 8,000 ppm of active ingredient.

EXAMPLE 36

A dispersible powder concentrate having the following percentage composition:

| | |
|---|---|
| 4-methyl-2-(2,2,2-trifluoroethyl) diester of 3,5-dimethyl-2,4-pyrroledicarboxylic acid | 50% |
| Kaolinite clay (finely divided) | 46% |
| Sodium salt of condensed mono-naphthalene sulfonic acid (Lomar D) | 4% | was prepared by mixing 50 g. of 4-methyl-2-(2,2,2-trifluoroethyl) diester of 3,5-dimethyl-2,4-pyrroledicarboxylic acid, 46 g. of the kaolinite clay, and 4 g. of Lomar D. The mixture was milled to an average particle size of 5 to 30 microns.

EXAMPLE 37

A granular formulation having the following percentage composition:

| | |
|---|---|
| 2-ethyl-4-methyl diester of 5-methyl-3-trifluoromethyl-2,4-pyrroledicarboxylic acid | 1% |
| Pyrophyllite (30/60 mesh) | 99% | was prepared by dissolving 1.0 lb. of 2-ethyl-4-methyl diester of 5-methyl-3-trifluoromethyl-2,4-pyrroledicarboxylic acid in 10.0 l. of ethylene dichloride and spraying the solution on 99.0 lbs. of pyrophyllite. The granules were dried and then packaged for use.

EXAMPLE 38

In a test, various amounts of 2-ethyl-4-methyl diester of 3-ethyl-5-methyl-2,4-pyrroledicarboxylic acid were applied to substantially uniform volumes of a pond compartmented by plastic partitions. Each compartment had 20 sq. ft. of surface area and water depth was 3 ft. Each had about the same association of aquatic plant life, particularly plankton and filamentous algae. The compound was applied by underwater injection in amounts calculated to obtain concentrations of 2 ppm, 1 ppm, 0.5 ppm, and 0.25 ppm.

After 6 weeks, during midsummer, the control of plankton and filamentous algae was observed to be 100, 90, 30%, and imperceptible, respectively.

We claim:

1. The method of controlling weeds and growth of plants which comprises contacting germinating weed seeds, weed seedlings, and growing plants with a herbicidal and plant growth influencing amount of a 4-methyl-2-variable diester of 5-methyl-3-variable'-2,4-pyrroledicarboxylic acid having the formula:

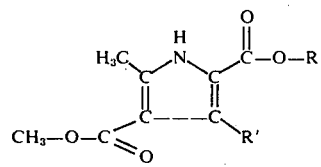

wherein the variable R is alkyl of from 2 to 12 carbon atoms, inclusive; haloalkyl of from 2 to 12 carbon atoms, inclusive; alkenyl of from 3 to 8 carbon atoms, inclusive; haloalkenyl of from 3 to 8 carbon atoms, inclusive; cycloalkyl of from 3 to 6 ring atoms, inclusive; alkyl or halogen substituted cycloalkyl of from 4 to 12 carbon atoms, inclusive; cycloalkenyl of from 4 to 6 ring atoms, inclusive; alkyl or halogen substituted cycloalkenyl of from 5 to 12 carbon atoms, inclusive; cycloalkyl or cycloalkenyl substituted lower-alkyl of from 4 to 12 carbon atoms, inclusive; and alkoxy substituted lower-alkyl having a total of from 3 to 9 carbon atoms, inclusive; and the variable R' is hydrogen, methyl (except when R is ethyl), ethyl, propyl, isopropyl, butyl, isobutyl, sec-butyl, tert-butyl, and the same halolower-alkyl.

2. The method according to claim 1 wherein R is alkyl or haloalkyl of from 2 to 8 carbon atoms, inclusive.

3. The method according to claim 2 wherein R is ethyl, isopropyl, 1-ethylpropyl, isobutyl, sec-butyl, neopentyl, and 1-methylheptyl.

4. The method according to claim 3 wherein the compound is 2-isopropyl-4-methyl diester of 3,5-dimethyl-2,4-pyrroledicarboxylic acid.

5. The method according to claim 3 wherein the compound is 2-(1-ethylpropyl)-4-methyl diester of 3,5-dimethyl-2,4-pyrroledicarboxylic acid.

6. The method according to claim 3 wherein the compound is 2-isobutyl-4-methyl diester of 3,5-dimethyl-2,4-pyrroledicarboxylic acid.

7. The method according to claim 3 wherein the compound is 4-methyl-2-sec-butyl diester of 3,5-dimethyl-2,4-pyrroledicarboxylic acid.

8. The method according to claim 3 wherein the compound is 4-methyl-2-neopentyl diester of 3,5-dimethyl-2,4-pyrroledicarboxylic acid.

9. The method according to claim 3 wherein the compound is 4-methyl-2-(1-methylheptyl) diester of 3,5-dimethyl-2,4-pyrroledicarboxylic acid.

10. The method according to claim 2 wherein R is haloalkyl.

11. The method according to claim 10 wherein the compound is 4-methyl-2-(2,2,2-trifluoroethyl) diester of 3,5-dimethyl-2,4-pyrroledicarboxylic acid.

12. The method according to claim 10 wherein the compound is 4-methyl-2-(2,2,2-trichloroethyl) diester of 3,5-dimethyl-2,4-pyrroledicarboxylic acid.

13. The method according to claim 10 wherein the compound is 4-methyl-2-(2,2,3,3,3-pentafluoropropyl) diester of 3,5-dimethyl-2,4-pyrroledicarboxylic acid.

14. The method according to claim 10 wherein the compound is 4-methyl-2-[2,2,2-trifluoro-1-(trifluoromethyl)ethyl] diester of 3,5-dimethyl-2,4-pyrroledicarboxylic acid.

15. The method according to claim 1 wherein R' is haloalkyl of from 1 to 4 carbon atoms.

16. The method according to claim 15 wherein R is alkyl or haloalkyl.

17. The method according to claim 16 wherein "3-haloalkyl" is 3-fluoroalkyl.

18. The method according to claim 17 wherein fluoroalkyl is trifluoromethyl.

19. The method according to claim 18 wherein R is alkyl.

20. The method according to claim 19 wherein the compound is 2-ethyl-4-methyl diester of 5-methyl-3-trifluoromethyl-2,4-pyrroledicarboxylic acid.

21. The method according to claim 10 wherein the compound is 2-(2-chloroethyl)-4-methyl diester of 3,5-dimethyl-2,4-pyrroledicarboxylic acid.

22. The method according to claim 1 wherein the compound is 2-ethyl-4-methyl diester of 3-ethyl-5-methyl-2,4-pyrroledicarboxylic acid.

23. The method according to claim 1 wherein the compound is 4-methyl-2-isopropyl diester of 5-methyl-3-propyl-2,4-pyrroledicarboxylic acid.

24. The method according to claim 1 wherein the compound is 2-ethyl-4-methyl diester of 5-methyl-3-propyl-2,4-pyrroledicarboxylic acid.

* * * * *

UNITED STATES PATENT AND TRADEMARK OFFICE
CERTIFICATE OF CORRECTION

PATENT NO. : 3,922,163

DATED : November 25, 1975

INVENTOR(S) : Allen R. Church and Gerhard A. Huppi

It is certified that error appears in the above—identified patent and that said Letters Patent is hereby corrected as shown below:

Column 1, line 32, the formula should read as follows instead of as appears in the issued patent:

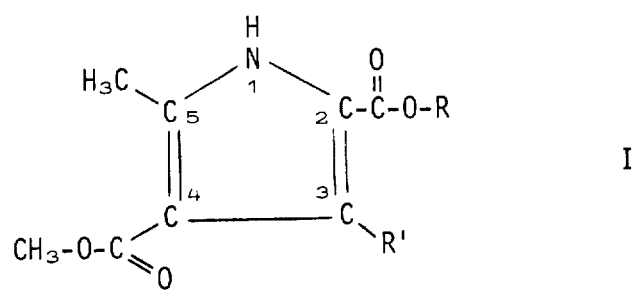

I

Column 3, line 22, the formula should read as follows instead of as appears in the issued patent:

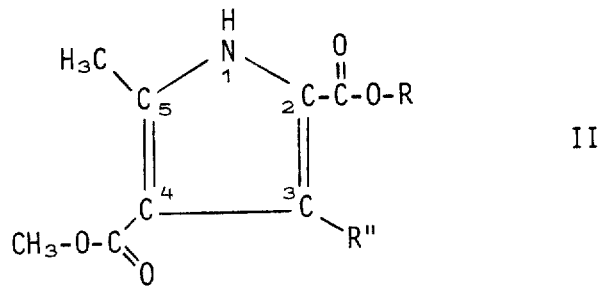

II

UNITED STATES PATENT AND TRADEMARK OFFICE
CERTIFICATE OF CORRECTION

PATENT NO. : 3,922,163
DATED : November 25, 1975
INVENTOR(S) : Allen R. Church and Gerhard A. Huppi It is certified that error appears in the above—identified patent and that said Letters Patent is hereby corrected as shown below:

Column 5, line 57, the formula should read as follows instead of as appears in the issued patent:

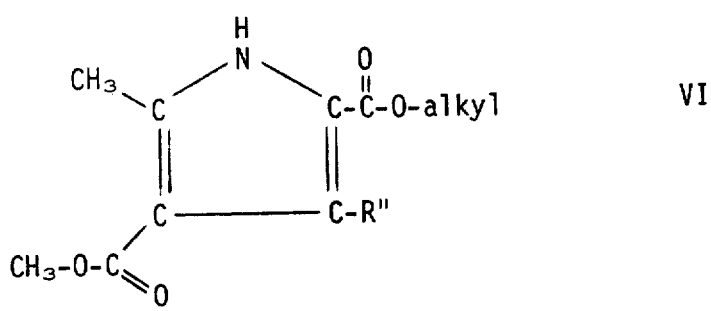

VI

Column 6, line 24, the formula should read as follows instead of as appears in the issued patent:

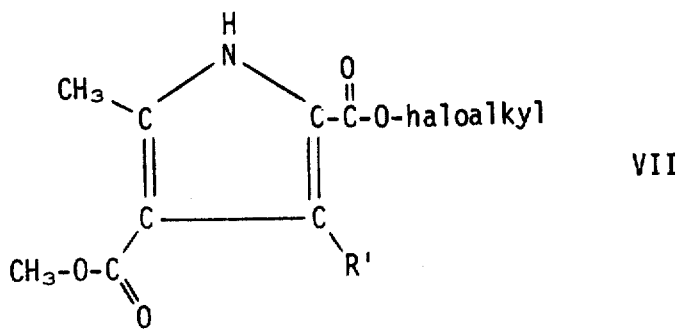

VII

UNITED STATES PATENT AND TRADEMARK OFFICE
CERTIFICATE OF CORRECTION

PATENT NO. : 3,922,163

DATED : November 25, 1975

INVENTOR(S) : Allen R. Church and Gerhard A. Huppi

It is certified that error appears in the above—identified patent and that said Letters Patent is hereby corrected as shown below:

Column 9, line 49, "2-(2-methoxy-4-methyl diester of 3,5-dimethyl-" should read -- 2-(2-methoxyethyl)-4-methyl diester of 3,5-dimethyl- --;

Column 10, line 28, "N, 5.33." should read -- N, 5.53. --.

Column 20, end of line 41 and beginning of line 42, "absorbed" should read -- adsorbed --.

Column 22, line 15, the formula should read as follows instead of as appears in the issued patent:

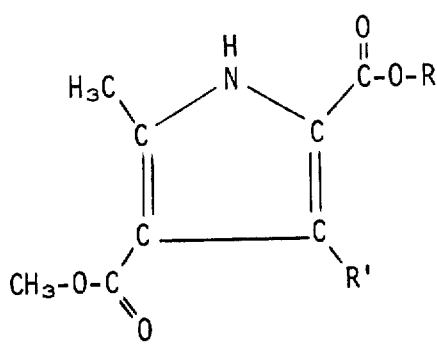

Signed and Sealed this

Twentieth Day of December 1983

[SEAL]

Attest:

GERALD J. MOSSINGHOFF

Attesting Officer

Commissioner of Patents and Trademarks